US007011341B2

(12) United States Patent
Herberg et al.

(10) Patent No.: US 7,011,341 B2
(45) Date of Patent: Mar. 14, 2006

(54) FOUR-POINT VEHICLE OCCUPANT RESTRAINT SYSTEM WITH LINKED LAP BELT RETRACTORS

(75) Inventors: Arnold J. Herberg, Davisburg, MI (US); Joseph J. Zwolinski, Sterling Heights, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 113 days.

(21) Appl. No.: 10/608,052

(22) Filed: Jun. 27, 2003

(65) Prior Publication Data

US 2004/0262905 A1    Dec. 30, 2004

(51) Int. Cl.
*B60R 22/34*    (2006.01)

(52) U.S. Cl. ............ 280/807; 280/808; 280/801.1; 297/475; 297/484; 242/378.4; 340/457.1

(58) Field of Classification Search ............. 280/807, 280/808, 801.1; 297/484, 475; 242/378.4; 340/438, 457.1
See application file for complete search history.

(56) References Cited

U.S. PATENT DOCUMENTS

| | | | |
|---|---|---|---|
| 2,195,334 A | 3/1940 | Lethern | |
| 2,899,146 A | 8/1959 | Barecki | |
| 3,241,883 A * | 3/1966 | Fontaine | ............ 280/807 |
| 3,572,832 A | 3/1971 | Graham et al. | |
| 4,147,387 A * | 4/1979 | Coenan | ............ 297/475 |
| 4,427,163 A | 1/1984 | Kondziola | |
| 4,434,953 A | 3/1984 | Gemar et al. | |
| 4,518,130 A * | 5/1985 | Gloomis | ............ 280/807 |
| 5,560,565 A | 10/1996 | Merrick et al. | |
| 5,704,684 A | 1/1998 | Dukatz et al. | |
| 6,076,894 A | 6/2000 | Busch | |
| 6,149,094 A * | 11/2000 | Martin et al. | ............ 242/373 |
| 6,773,075 B1 * | 8/2004 | Rouhana et al. | ............ 297/484 |
| 6,817,629 B1 * | 11/2004 | Herberg et al. | ............ 280/807 |
| 2002/0109392 A1 | 8/2002 | Petri et al. | |
| 2003/0034686 A1 | 2/2003 | Soderstrom et al. | |

* cited by examiner

*Primary Examiner*—Ruth Ilan
(74) *Attorney, Agent, or Firm*—Tarolli, Sundheim, Covell & Tummino L.L.P.

(57) ABSTRACT

A vehicle restraint system (30) comprises first and second lap belts (32 and 34), first and second shoulder belts (36 and 38), and a buckle assembly (90) for interconnecting the lap belts (32 and 34) and the shoulder belts (36 and 38). The vehicle restraint system (30) also comprises first and second lap belt retractors (46 and 104) for the first and second lap belts (32 and 34), respectively. A linking mechanism (218) connects the first and second lap belt retractors (46 and 104) and is adapted to transfer motion between the first and second lap belt retractors (46 and 104). As a result, the first and second lap belts (32 and 34) are retracted in unison and by equal amounts during retraction and are withdrawn in unison and by equal amounts during withdrawal from the first and second lap belt retractors (46 and 104).

32 Claims, 4 Drawing Sheets

FOUR-POINT VEHICLE OCCUPANT RESTRAINT SYSTEM WITH LINKED LAP BELT RETRACTORS

TECHNICAL FIELD

The present invention relates to an occupant restraint system for a vehicle. More particularly, the present invention relates to a four-point seat belt system having two lap belt retractors that are linked together.

BACKGROUND OF THE INVENTION

A conventional four-point seat belt system includes two lap belts and two shoulder belts. A first lap belt extends upwardly from a first lap belt retractor mounted on a right side of the vehicle seat and is fixed to a first portion of a buckle assembly. A second lap belt extends upwardly from a second lap belt retractor mounted on a left side of the vehicle seat and is fixed to a second portion of the buckle assembly. A first shoulder belt extends from a first shoulder belt retractor downward and is fixed to the first portion of the buckle assembly. A second shoulder belt extends from a second shoulder belt retractor downward and is fixed to the second portion of the buckle assembly.

For helping to restrain an occupant in the vehicle seat, it is desirable to position the buckle assembly of the four-point seat belt system along a centerline of the occupant. When the buckle assembly is positioned along the centerline of the occupant, the first and second shoulder belts extend over the shoulders of the occupant and across the torso of the occupant to help restrain the occupant in the seat.

SUMMARY OF THE INVENTION

The present invention relates to a vehicle restraint system for helping to restrain a vehicle occupant in a vehicle seat. The vehicle restraint system comprises first and second lap belts for collectively extending across a lap of the occupant and first and second shoulder belts for extending over the shoulders of the occupant. A buckle assembly interconnects the lap belts and the shoulder belts. The vehicle restraint system also comprises first and second lap belt retractors for the first and second lap belts, respectively. The first and second lap belt retractors are spaced away from one another and enable retraction and withdrawal of the first and second lap belts, respectively. A linking mechanism connects the first and second lap belt retractors and is adapted to transfer motion between the first and second lap belt retractors. As a result, the first and second lap belts are retracted in unison and by equal amounts during retraction and are withdrawn in unison and by equal amounts during withdrawal from the first and second lap belt retractors.

According to another aspect, the present invention relates to a vehicle restraint system for helping to restrain a vehicle occupant in a vehicle seat. The vehicle restraint system comprises first and second lap belts for collectively extending across a lap of the occupant and first and second shoulder belts for extending over the shoulders of the occupant. A buckle assembly interconnects the lap belts and the shoulder belts. The vehicle restraint system also comprises first and second lap belt retractors for the first and second lap belts, respectively. The first and second lap belt retractors are spaced away from one another and enable retraction and withdrawal of the first and second lap belts, respectively. A gear drive assembly connects the first and second lap belt retractors and is adapted to transfer motion between the first and second lap belt retractors. As a result, the first and second lap belts are retracted in unison and by equal amounts during retraction and are withdrawn in unison and by equal amounts during withdrawal from the first and second lap belt retractors.

In accordance with yet another aspect, the present invention relates to a vehicle restraint system for helping to restrain a vehicle occupant in a vehicle seat. The vehicle restraint system comprises first and second lap belts for collectively extending across a lap of the occupant and first and second shoulder belts for extending over the shoulders of the occupant. A buckle assembly interconnects the lap belts and the shoulder belts. The vehicle restraint system further comprises linked first and second lap belt retractors for the first and second lap belts, respectively. The linked first and second lap belt retractors retract the first and second lap belts in unison and by equal amounts during retraction and enable withdrawal of the first and second lap belts in unison and by equal amounts during withdrawal. The vehicle restraint system also comprises an indication system. The indication system includes sensors for sensing characteristics of the first and second lap belts, respectively. The indication system also includes an indicator for indicating to an occupant that the first and second lap belts and the first and second shoulder belts are not being worn correctly when the sensed characteristics of the first and second lap belts differ by a predetermined amount.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
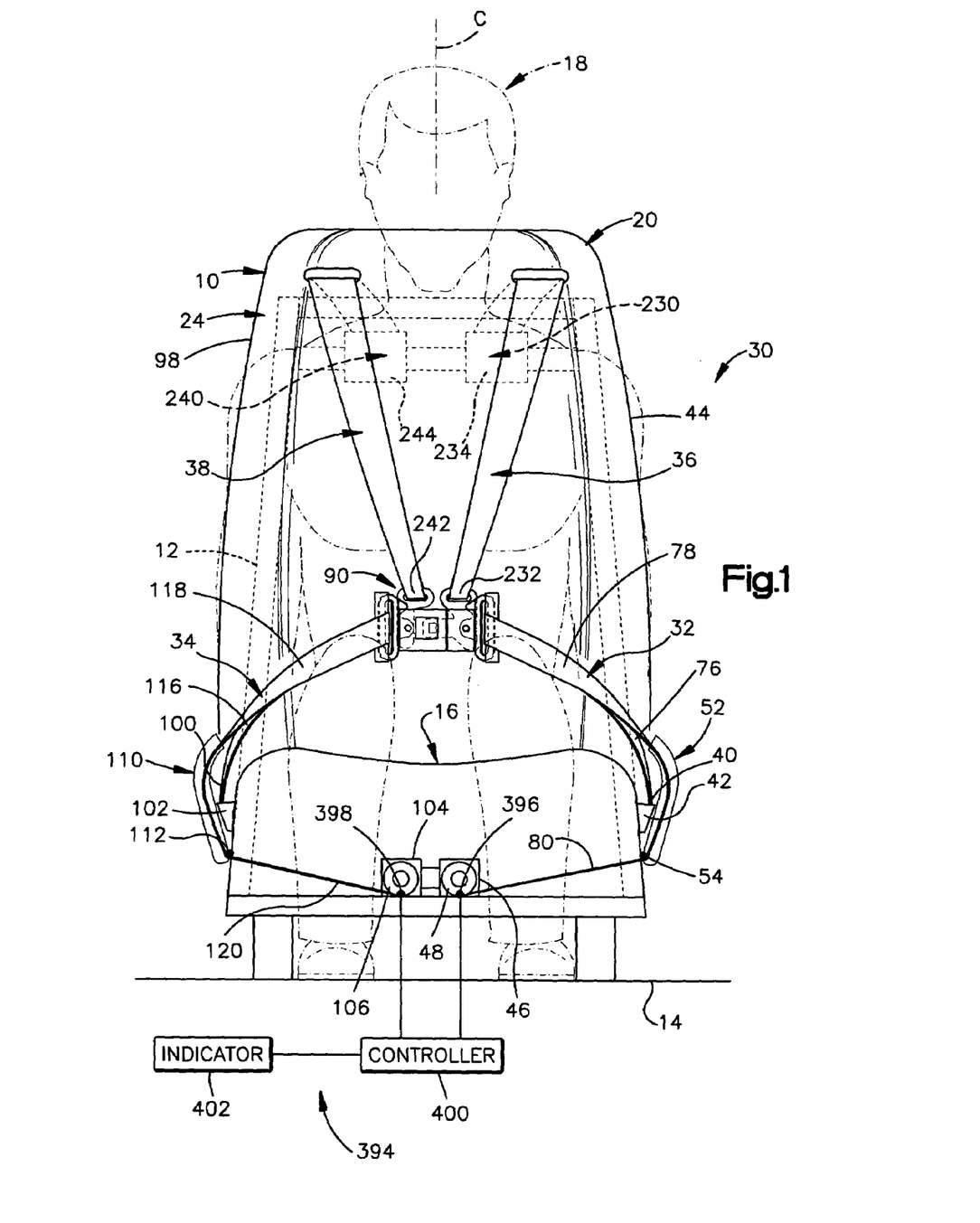
FIG. 1 is a schematic illustration of an occupant restraint system constructed in accordance with the present invention.

A vehicle seat 10 is shown in FIG. 1. The seat 10 includes a frame 12 that is secured to the vehicle 14 in a known manner. The seat 10 also includes a cushion portion 16 upon which a vehicle occupant 18 sits and a backrest portion 20 that extends upwardly from the cushion portion. The backrest portion 20 of the seat 10 is pivotally connected to the cushion portion 16 of the seat. An upper portion 24 of the backrest portion 20 of the seat 10 is located adjacent the shoulders of the seated occupant 18.

FIG. 1 also illustrates a vehicle restraint system 30 for helping to restrain the occupant 18 in the seat 10. The vehicle restraint system 30 illustrated in FIG. 1 may be referred to as a "four-point seat belt system." The four-point seat belt system includes lap belts 32 and 34 and shoulder belts 36 and 38. Each lap belt 32 and 34 is extensible over a portion of the lap of the occupant 18, and each shoulder belt 36 and 38 is extensible over an associated shoulder of the occupant.

Lap belt 32 has an end 40 that is connected to an anchor 42 on the left side 44 of the seat 10. The anchor 42 is attached to the frame 12 of the seat 10 in a location near the pivotal connection of the backrest portion 20 of the seat and the cushion portion 16 of the seat. The end 40 of the lap belt 32 is pivotal about the anchor 42 and relative to the seat 10.

An opposite end (not shown) of lap belt 32 is connected to a spool 48 of a lap belt retractor 46. The lap belt retractor 46 is mounted to the frame 12 of the seat 10 in a location below the cushion portion 16 of the seat. The lap belt retractor 46 is discussed in detail below.

A tubular lap belt guide 52 is attached to the frame 12 on the left side 44 of the seat 10, spaced forward (out of the plane of FIG. 1) relative to the anchor 42. The lap belt guide 52 includes a D-ring portion, indicated schematically in FIG. 1 at 54, at which the lap belt 32 turns toward the lap belt retractor 46.

A first length 76 of lap belt 32 extends from end 40 and upward to a buckle assembly 90. A second length 78 of lap belt 32 extends downward from the buckle assembly 90, into the lap belt guide 52, and partially around the D-ring portion 54 of the lap belt guide. The first length 76 is oriented at an acute angle relative to the second length 78. The direction of lap belt 32 changes at the D-ring portion 54 of the lap belt guide 52. A third length 80 of lap belt 32 extends from the D-ring portion 54 of the lap belt guide 52 to the lap belt retractor 46.

The sum of the first, second, and third lengths, 76, 78, and 80 respectively, of lap belt 32 equals the withdrawn length of lap belt 32. Pulling upwardly on the second length 78 to withdraw lap belt 32 from the lap belt retractor 46 varies the withdrawn length of lap belt 32.

Lap belt 34 has an end 100 that is connected to an anchor 102 on the right side 98 of the seat 10. The anchor 102 is attached to the frame 12 of the seat 10 in a location near the pivotal connection of the backrest portion 20 of the seat and the cushion portion 16 of the seat. The end 100 of the lap belt 34 is pivotal about the anchor 102 and relative to the seat 10.

An opposite end (not shown) of lap belt 34 is connected to a spool 106 of a lap belt retractor 104. The lap belt retractor 104 is mounted to the frame 12 of the seat 10 in a location below the cushion portion 16 of the seat. The lap belt retractor 104 is discussed in detail below.

A tubular lap belt guide 110 is attached to the right side 98 of the seat 10, spaced forward (out of the plane of FIG. 1) of the anchor 102. The lap belt guide 110 includes a D-ring portion, indicated schematically in FIG. 1 at 112, at which the lap belt 34 turns toward the lap belt retractor 104.

A first length 116 of lap belt 34 extends from end 100 and upward to the buckle assembly 90. A second length 118 of lap belt 34 extends downward from the buckle assembly 90, into the lap belt guide 110, and partially around the D-ring portion 112 of the lap belt guide. The first length 116 is oriented at an acute angle relative to the second length 118. A third length 120 of lap belt 34 extends from the D-ring portion 112 of the lap belt guide 110 to the lap belt retractor 104.

The sum of the first, second, and third lengths 116, 118, and 120 of lap belt 34 equals the withdrawn length of lap belt 34. Pulling upwardly on the second length 118 to withdraw lap belt 34 from the lap belt retractor 104 varies the withdrawn length of lap belt 34.

Figure 2:
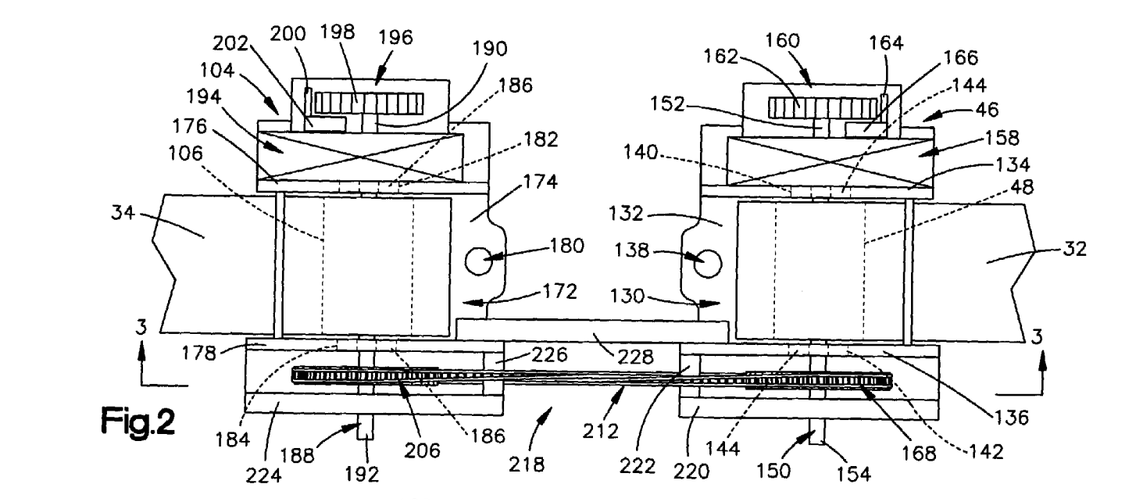
FIG. 2 illustrates an enlarged plan view of linked lap belt retractors of the occupant restraint system of FIG. 1.
Figure 3:
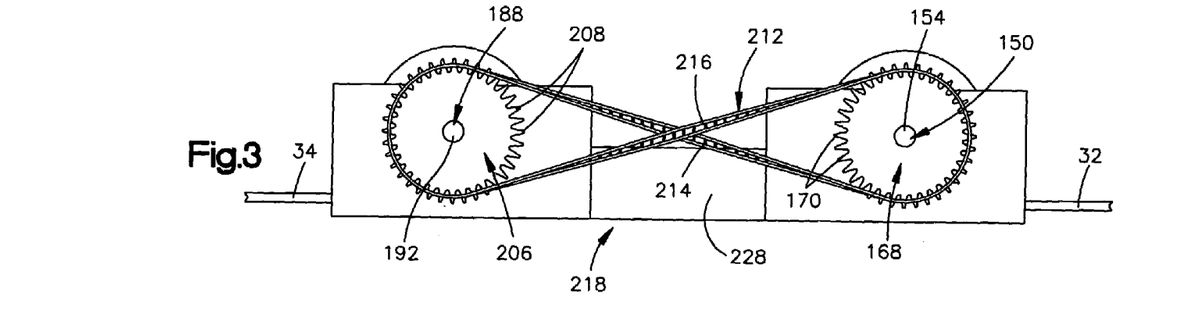
FIG. 3 is a view taken along line 3—3 of FIG. 2.

FIGS. 2 and 3 illustrate enlarged views of lap belt retractors 46 and 104 of the four-point seat belt system 30 of FIG. 1. Lap belt retractor 46 includes a mounting frame 130. The mounting frame 130 includes an end wall 132 and first and second side walls 134 and 136, respectively, that extend outwardly of the end wall. The end wall 132 includes at least one aperture 138 for receiving a fastener (not shown). The fastener fixedly attaches the end wall 132 of the mounting frame 130 to the frame 12 of the seat 10 in a location under the cushion portion 16 of the seat.

Each of the first and second side walls 134 and 136 includes an aperture 140 and 142, respectively. The aperture 140 of the first side wall 134 is coaxial with the aperture 142 of the second side wall 136. A rotary bearing 144 is supported in each aperture 140 and 142 of the first and second side walls 134 and 136.

The spool 48 of lap belt retractor 46 is cylindrical and includes first and second axial ends (not shown). An axle 150 having first and second ends 152 and 154, respectively, extends through the spool 48 and is fixed for rotation with the spool. The first and second ends 152 and 154 of the axle 150 extend outwardly of the first and second axial ends, respectively, of the spool 48. The rotary bearings 144 support the axle 150 relative to the mounting frame 130 and enable rotation of the spool 48 relative to the mounting frame.

Lap belt retractor 46 also includes a rewind spring 158 and a locking mechanism 160. The rewind spring 158 is connected between the mounting frame 130 and the spool 48 and acts to rotate the spool in a direction for retracting lap belt 32. The locking mechanism 160 includes a ratchet wheel 162 and a locking pawl 164. The ratchet wheel 162 is fixedly attached to the first end 152 of the axle 150 and is fixed for rotation with the axle. The locking pawl 164 is pivotally mounted in the mounting frame 130 and is actuatable for engaging the ratchet wheel 162 to prevent rotation of the spool 48 in a direction for enabling withdrawal of lap belt 32. An actuation mechanism 166 for actuating the locking pawl 164 into engagement with the ratchet wheel 162 is responsive to either or both vehicle deceleration or rotational acceleration of the spool 48. The actuation mechanism 166 of the locking mechanism 160 may alternatively include a solenoid (not shown) that is electrically connected to a crash sensor (not shown) and is responsive to signals from the crash sensor.

A sprocket wheel 168 is fixedly attached to the second end 154 of the axle 150. Thus, the sprocket wheel 168 is fixed for rotation with the axle 150 and the spool 48. A plurality of teeth 170 (FIG. 3) extend radially outwardly of the sprocket wheel 168. The teeth 170 are spaced equally about the circumference of the sprocket wheel 168.

Lap belt retractor 104 is a mirror-image of lap belt retractor 46. Lap belt retractor 104 includes a mounting frame 172. The mounting frame 172 includes an end wall 174 and first and second side walls 176 and 178, respectively, that extend outwardly of the end wall. The end wall 174 includes at least one aperture 180 for receiving a fastener (not shown). The fastener fixedly attaches the end wall 174 of the mounting frame 172 to the frame 12 of the seat 10 in a location under the cushion portion 16 of the seat. Each of the first and second side walls 176 and 178 includes an aperture 182 and 184, respectively. The aperture 182 of the first side wall 176 is coaxial with the aperture 184 of the second side wall 178. A rotary bearing 186 is supported in each aperture 182 and 184 of the first and second side walls 176 and 178.

The spool 106 of lap belt retractor 104 is cylindrical and includes first and second axial ends (not shown). The spool 106 for lap belt retractor 104 is equal in diameter to the spool 48 of lap belt retractor 46. Preferably, the spool 106 for lap belt retractor 104 is identical to the spool 48 of lap belt retractor 46. An axle 188 having first and second ends 190 and 192, respectively, extends through the spool 106 and is fixed for rotation with the spool. The first and second ends 190 and 192 of the axle 188 extend outwardly of the first and second axial ends, respectively, of the spool 106. The rotary bearings 186 support the first and second ends 190 and 192 of the axle 188 relative to the mounting frame 172 and enable rotation of the spool 106 relative to the mounting frame.

Lap belt retractor 104 also includes a rewind spring 194 and a locking mechanism 196. The rewind spring 194 is connected between the mounting frame 172 and the spool 106 and acts to rotate the spool in a direction for retracting lap belt 34. The locking mechanism 196 includes a ratchet wheel 198 and a locking pawl 200. The ratchet wheel 198 is fixedly attached to the first end 190 of the axle 188 and rotates with the axle and the spool 106. The locking pawl 200 is pivotally mounted in the mounting frame 172 and is actuatable for engaging the ratchet wheel 198 to prevent rotation of the spool 106 in a direction enabling withdrawal of lap belt 34. An actuation mechanism 202 for actuating the locking pawl 200 is responsive to either or both vehicle deceleration or rotational acceleration of the spool 106. The actuation mechanism 202 of the locking mechanism 196 may alternatively include a solenoid (not shown) that is electrically connected to a crash sensor (not shown) and is responsive to signals from the crash sensor.

A sprocket wheel 206 is fixedly attached to the second end 192 of the axle 188. Thus, the sprocket wheel 206 rotates with the axle 188 and the spool 106. Sprocket wheel 206 is equal in diameter to sprocket wheel 168. Preferably, sprocket wheel 206 is identical to sprocket wheel 168. A plurality of teeth 208 (FIG. 3) extends radially outwardly of the sprocket wheel 206. The teeth 208 are spaced equally about the circumference of the sprocket wheel 206.

The four-point seat belt system 30 also includes a flexible chain 212 for linking the lap belt retractors 46 and 104. Preferably, the chain 212 is formed from a metallic cable that is coated with a plastic material. The chain 212 includes a plurality of apertures, each sized for receiving a tooth 170, 208 of a sprocket wheel 168, 206. The chain 212 also includes opposite side surfaces 214 and 216 (FIG. 3), each of which is adapted to engage a respective sprocket wheel 168 and 206.

The chain 212 and sprocket wheels 168 and 206, collectively, form a linking mechanism 218 for linking together the spools 48 and 106 of the lap belt retractors 46 and 104. When linked together, the spools 48 and 106 of the lap belt retractors 46 and 104 rotate in unison during retraction and withdrawal of lap belts 32 and 34. Additionally, when the lap belt retractors are linked by the linking mechanism 218, an equal amount of each lap belt 32 and 34 is wound onto or retracted from the spools 48 and 106 during rotation of the spools.

To link the lap belt retractors 46 and 104 together, the chain 212 is positioned about the sprocket wheels 168 and 206 so that some of the teeth 170 and 208 of the sprocket wheels engage the chain. To enable retraction and withdrawal of lap belts 32 and 34 in unison, the spools 48 and 106 of the lap belt retractors 46 and 104, illustrated in FIGS. 1–3 must rotate in opposite directions. For example, to retract lap belts 32 and 34, spool 48 of lap belt retractor 46 rotates in a clockwise direction, as viewed in FIGS. 1 and 3, while spool 106 of lap belt retractor 104 rotates in a counter-clockwise direction.

To enable rotation in opposite directions, portions of the chain 212 cross one another in the area between the lap belt retractors 46 and 104. Thus, rotation of spool 48 in a direction for retraction of lap belt 32 causes simultaneous and equal rotation of spool 106 in a direction for retraction of lap belt 34. The portions of the chain 212 may contact one another at the point where they cross one another. If contact between portions of the chain 212 is unwanted, a guide (not shown) may be provided to prevent contact of the portions of the chain 212.

The chain 212 is turned or twisted in the area between the lap belt retractors 46 and 104 so that the first side surface 214 of the chain 212 engages the sprocket wheel 168 of lap belt retractor 46 and the second side surface 216 of the chain engages the sprocket wheel 206 of lap belt retractor 104. As a result of the turning or twisting of the chain 212 in the area between the lap belt retractors 46 and 104, the portions of the chain 212 at the point where they cross one another are oriented with the side surfaces 214, 216 extending vertically, as shown in FIG. 3, to reduce interference between the portions of the chain.

As shown in FIG. 2, lap belt retractor 46 also includes a guard wall 220 that is located adjacent a side of the sprocket wheel 168 opposite the second side wall 136 of the lap belt retractor. A support beam 222 connects the guard wall 220 to the second side wall 136. The guard wall 220 helps to support the second end 154 of axle 150 and helps to limit access to the sprocket wheel 168.

Lap belt retractor 104 also includes a guard wall 224 that is located adjacent a side of the sprocket wheel 206 opposite the second side wall 178 of the lap belt retractor. A support beam 226 connects the guard wall 224 to the second side wall 178. The guard wall 224 helps to support the second end 192 of axle 188 and helps to limit access to the sprocket wheel 206.

A spacer wall 228 connects lap belt retractor 46 to lap belt retractor 104. The spacer wall 228 is attached to the second side wall 136 of lap belt retractor 46 and to the second side wall 178 of lap belt retractor 104. Preferably, the spacer wall 228 includes slots (not shown) for receiving fasteners for attaching the spacer wall to the second side walls 136 and 178 of the lap belt retractors 46 and 104, respectively. The slots enable the position of the spacer wall 228 relative to the second side walls 136 and 178 to be adjusted and enable the spacer wall to be used as a tensioning device for applying a proper tension to the chain 212.

Each of the shoulder belts 36 and 38 of the four-point seat belt system 30 extends outwardly from the upper portion 24 of the backrest portion 20 of the seat 10. Shoulder belt 36 has a first end (not shown) that is connected with a shoulder belt retractor 230 and a second end 232 that is connected to the buckle assembly 90. Shoulder belt retractor 230 is mounted on the frame 12 of the backrest portion 20 of the seat 10. When the occupant 18 is seated in the seat 10, as shown in FIG. 1, shoulder belt 36 extends over the left shoulder of the occupant.

Shoulder belt retractor 230 includes a spool 234, shown schematically in FIG. 1. The first end of shoulder belt 36 is secured to the spool 234 of shoulder belt retractor 230, and a portion of shoulder belt 36 is wound around the spool.

Shoulder belt retractor 230 includes a rewind spring (not shown) and a locking mechanism (not shown). The rewind spring is connected with the spool 234 and applies a force to the spool for rotating the spool in a direction for retracting shoulder belt 36. The locking mechanism is of a known design and, when actuated, prevents rotation of the spool 234 of the shoulder belt retractor 230 in a direction enabling withdrawal of shoulder belt 36.

Shoulder belt 38 has a first end (not shown) that is connected with shoulder belt retractor 240 and a second end 242 that is connected to the buckle assembly 90. Shoulder belt retractor 240 is mounted on the frame 12 of the backrest portion 20 of the seat 10. When an occupant 18 is seated in the seat 10, as shown in FIG. 1, shoulder belt 38 extends over the right shoulder of the occupant.

Shoulder belt retractor 240 includes a spool 244, shown schematically in FIG. 1. The first end of shoulder belt 38 is secured to the spool 244 of shoulder belt retractor 240, and a portion of shoulder belt 38 is wound around the spool.

Shoulder belt retractor 240 includes a rewind spring (not shown) and a locking mechanism (not shown). The rewind spring is connected with the spool 244 and applies a force to the spool for rotating the spool in a direction for retracting shoulder belt 38. The locking mechanism is of a known design and, when actuated, prevents rotation of the spool 244 of the shoulder belt retractor 240 in a direction enabling withdrawal of shoulder belt 38.

The rewind springs 158 and 194 of the lap belt retractors 46 and 104 collectively apply a rewind force to the lap belts 32 and 34 that is greater than the collective forces of the rewind springs of shoulder belt retractors 230 and 240. Thus, when the lap belts 32 and 34 and the shoulder belts 36 and 38 are connected together at the buckle assembly 90, the rewind springs of the lap belt retractors 46 and 104 hold the buckle assembly 90 in position atop the lap of the occupant. The rewind springs of the shoulder belt retractors 230 and 240 do not pull the buckle assembly 90 upwardly away from the lap of the occupant 18.

Figure 4:
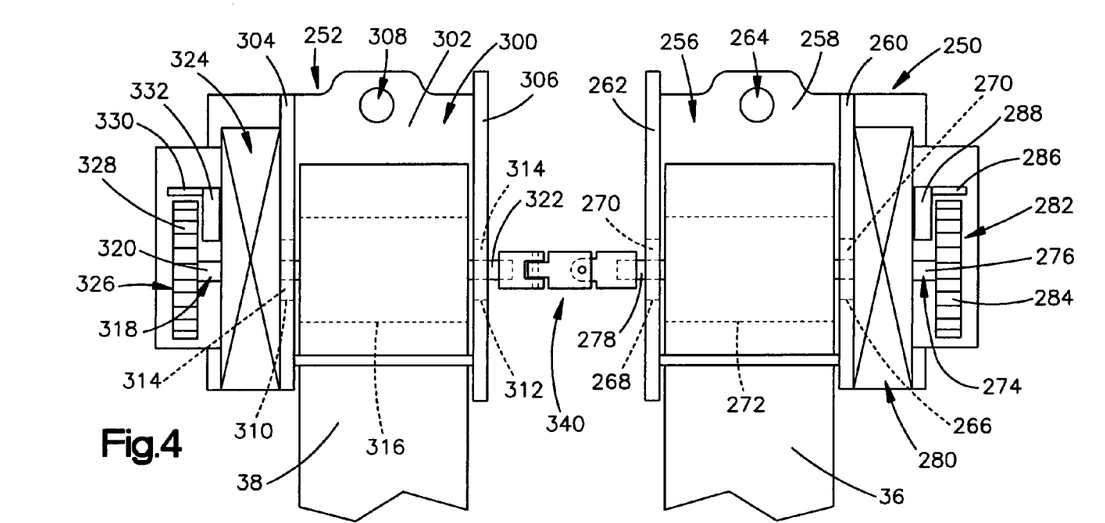
FIG. 4 illustrates an enlarged view of linked shoulder belt retractors, which may optionally be used in the occupant restraint system of FIG. 1.

As an alternative to separate and independent shoulder belt retractors, the shoulder belt retractors may be linked together. FIG. 4 illustrates linked shoulder belt retractors 250 and 252. The linked shoulder belt retractors 250 and 252 of FIG. 4 may be used in place of shoulder belt retractors 230 and 240 in the four-point seat belt system 30 of FIG. 1.

Shoulder belt retractor 250 includes a mounting frame 256. The mounting frame 256 includes an end wall 258 and first and second side walls 260 and 262, respectively, that extend outwardly of the end wall. The end wall 258 includes at least one aperture 264 for receiving a fastener (not shown). The fastener fixedly attached the end wall 258 of the mounting frame 256 to the frame 12 of the seat 10 in a location within the backrest portion 20 of the seat. Each of the first and second side walls 260 and 262 includes an aperture 266 and 268, respectively. The aperture 266 of the first side wall 260 is coaxial with the aperture 268 of the second side wall 262. A rotary bearing 270 is supported in each aperture 266 and 268 of the first and second side walls 260 and 262, respectively.

The spool 272 of shoulder belt retractor 250 is cylindrical and includes first and second axial ends (not shown). An axle 274 having first and second ends 276 and 278, respectively, extends through the spool 272 and is fixed for rotation with the spool. The first and second ends 276 and 278 of the axle 274 extend outwardly of the first and second axial ends of the spool 272. The rotary bearings 270 support the axle 274 relative to the mounting frame 256 and enable rotation of the spool 272 relative to the mounting frame.

Shoulder belt retractor 250 also includes a rewind spring 280 and a locking mechanism 282. The rewind spring 280 is connected between the mounting frame 256 and the spool 272 and acts to rotate the spool in a direction for retracting shoulder belt 36. The locking mechanism 282 includes a ratchet wheel 284 and a locking pawl 286. The ratchet wheel 284 is fixedly attached to the first end 276 of the axle 274 and rotates with the axle. The locking pawl 286 is pivotally mounted in the mounting frame 256 and is actuatable for engaging the ratchet wheel 284 to prevent rotation of the spool 272 in a direction enabling withdrawal of shoulder belt 36. An actuation mechanism 288 for actuating the locking pawl 286 is responsive to either or both vehicle deceleration or rotational acceleration of the spool 272. The actuation mechanism 288 of the locking mechanism 282 may alternatively include a solenoid (not shown) that is electrically connected to a crash sensor (not shown) and is responsive to signals from the crash sensor.

Shoulder belt retractor 252 is a mirror-image of shoulder belt retractor 250. Shoulder belt retractor 252 includes a mounting frame 300. The mounting frame 300 includes an end wall 302 and first and second side walls 304 and 306, respectively, that extend outwardly of the end wall. The end wall 302 includes at least one aperture 308 for receiving a fastener (not shown). The fastener fixedly attaches the end wall 302 of the mounting frame 300 to the frame 12 of the seat 10 in a location within the backrest portion 20 of the seat. Each of the first and second side walls 304 and 306 includes an aperture 310 and 312, respectively. The aperture 310 of the first side wall 304 is coaxial with the aperture 312 of the second side wall 306. A rotary bearing 314 is supported in each aperture 310 and 312 of the first and second side walls 304 and 306, respectively.

The spool 316 of shoulder belt retractor 252 is cylindrical and includes first and second axial ends (not shown). The spool 316 for shoulder belt retractor 252 is identical in diameter to the spool 272 of shoulder belt retractor 250. An axle 318 having first and second ends 320 and 322, respectively, extends through the spool 316 and is fixed for rotation with the spool. The first and second ends 320 and 322 of the axle 318 extend outwardly of the first and second axial ends of the spool 316. The rotary bearings 314 support the axle 318 relative to the mounting frame 300 and enable rotation of the spool 316 relative to the mounting frame.

Shoulder belt retractor 252 also includes a rewind spring 324 and a locking mechanism 326. The rewind spring 324 is connected between the mounting frame 300 and the spool 316 and acts to rotate the spool in a direction for retracting shoulder belt 38. The locking mechanism 326 includes a ratchet wheel 328 and a locking pawl 330. The ratchet wheel 328 is fixedly attached to the first end 320 of the axle 318 and rotates with the axle. The locking pawl 330 is pivotally mounted in the mounting frame 300 and is actuatable for engaging the ratchet wheel 328 to prevent rotation of the spool 316 in a direction enabling withdrawal of shoulder belt 38. An actuation mechanism 332 for actuating the locking pawl 330 is responsive to either or both vehicle deceleration or rotational acceleration of the spool 316. The actuation mechanism 332 of the locking mechanism 326 may alternatively include a solenoid (not shown) that electrically connected to a crash sensor (not shown) and is responsive to signals from the crash sensor.

Figure 4A:
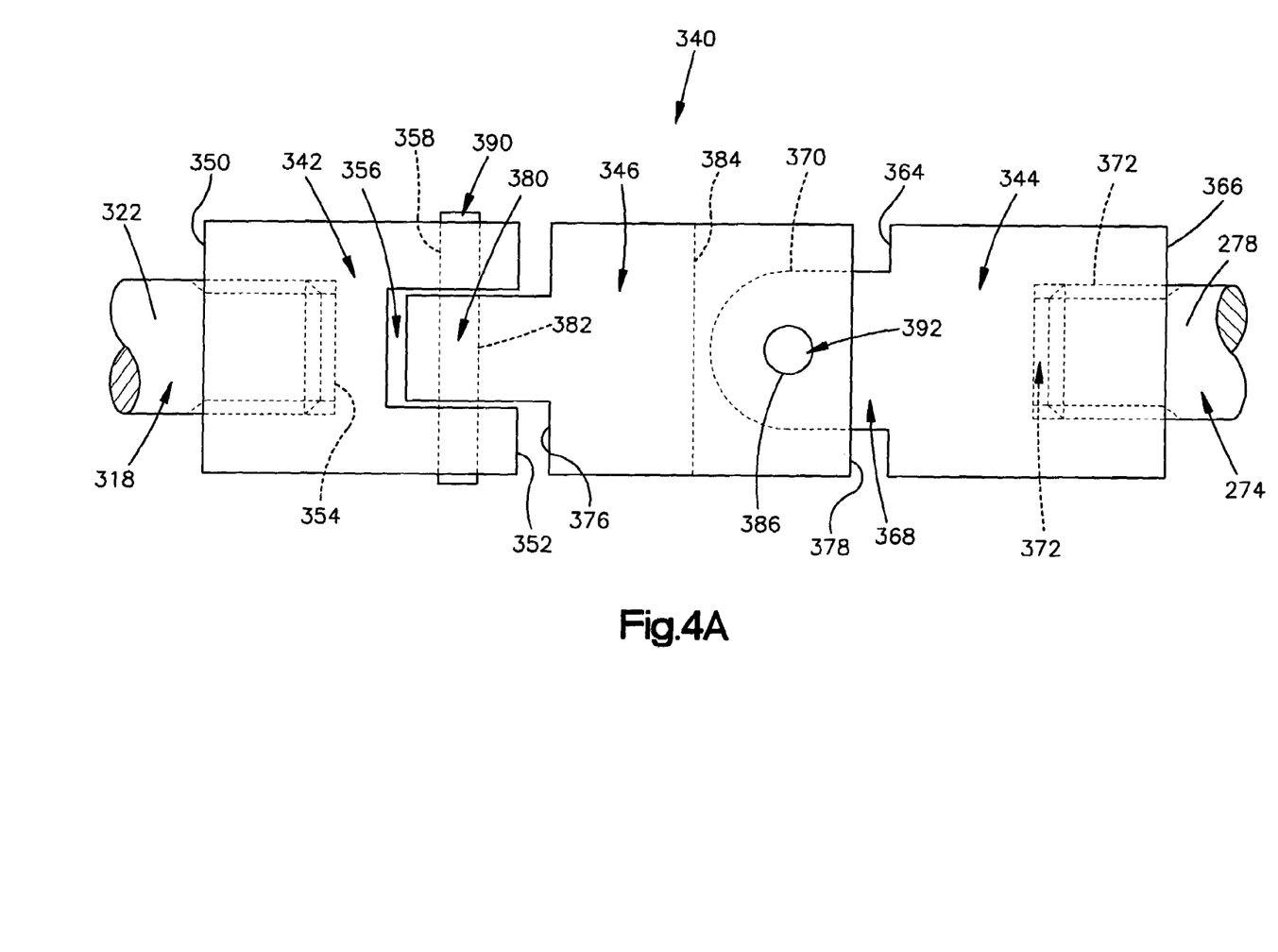
FIG. 4A is an enlarged view of a portion of FIG. 4.

A linking assembly 340 links the shoulder belt retractors 250 and 252. The linking assembly 340 is a universal joint. An enlarged view of the linking assembly 340 is shown in FIG. 4A. The linking assembly 340 includes outer segments 342 and 344, respectively, and an intermediate segment 346, each of which is generally cylindrical. The linking assembly 340 connects the axle 274 of shoulder belt retractor 250 to the axle 318 of shoulder belt retractor 252 so that the spools 272 and 316 of the shoulder belt retractors 250 and 252, respectively, rotate in unison and by equal amounts.

Outer segment 342 of the linking assembly 340 includes first and second axial ends 350 and 352, respectively. A bore 354 for receiving a portion of the axle 318 of the shoulder belt retractor 252 extends into the first axial end 350 of the outer segment 342. Preferably, a surface defining the bore is threaded for receiving a threaded second end 322 of the axle 318. The second axial end 352 of the outer segment 342 includes a radially extending slot 356. The slot 356 extends into and out of the plane of FIG. 4A. A channel 358 for receiving a pivot pin extends radially through the outer segment 342 and intersects the slot 356 near the second axial end 352 of the outer segment 342.

Outer segment 344 of the linking assembly 340 includes first and second axial ends 364 and 366, respectively. A narrow protrusion 368 extends axially outwardly of the first axial end 364 of the outer segment 344. The protrusion 368 includes a curved outer surface 370. A channel (not shown) for receiving a pivot pin extends through the protrusion 368. A bore 372 for receiving the second end 278 of the axle 274 of the shoulder belt retractor 250 extends into the second axial end 366 of the outer segment 344. Preferably, a surface defining the bore 372 is threaded for receiving a threaded second end 278 of the axle 274.

The intermediate segment 346 of the linking assembly 340 also includes first and second axial ends 376 and 378, respectively. A narrow protrusion 380 extends axially outwardly of the first axial end 376 of the intermediate segment 346. The protrusion 380 of the intermediate segment 346 is similar to the protrusion 368 of the outer segment 344. A channel 382 for receiving a pivot pin extends through the protrusion 380. The second axial end 378 of the intermediate segment 346 includes a radially extending slot 384 that is similar to the slot 356 in the second axial end 352 of outer segment 342. A channel 386 for receiving a pivot pin extends radially through the intermediate segment 346 and intersects the slot 384 near the second axial end 378 of the intermediate segment 346.

A pivot pin 390 pivotally connects the second axial end 352 of the outer segment 342 to the first axial end 376 of the intermediate segment 346. To connect the outer segment 342 to the intermediate segment 346, the protrusion 380 of the intermediate segment 346 is inserted in the slot 356 in the second axial end 352 of the outer segment 342. The channel 358 in the outer segment 342 is aligned with the channel 382 in the protrusion 380. The pivot pin 390 is inserted into the aligned channels 358 and 382 to pivotally connect the outer segment 342 and the intermediate segment 346.

A pivot pin 392 pivotally connects the second axial end 378 of the intermediate segment 346 to the first axial end 364 of the outer segment 344. To connect the intermediate segment 346 to the outer segment 344, the protrusion 368 of the outer segment 344 is inserted in the slot 384 in the second axial end 378 of the intermediate segment 346. The channel 386 in the intermediate segment is aligned with the channel in the protrusion 368. The pivot pin 392 is inserted into the aligned channels to pivotally connect the intermediate segment 346 and the outer segment 344.

As shown in FIG. 4A, the longitudinal axis of the pivot pin 390 and thus the pivot axis of the outer segment 342 and the intermediate segment 346 is oriented at a ninety degree angle relative to the longitudinal axis of the pivot pin 392 and the pivot axis of the intermediate segment 346 and the outer segment 344. Thus, the linking assembly 340 is adapted to compensate for misalignment between the axles 274 and 318 of the shoulder belt retractors 250 and 252, respectively, while ensuring that the spools 272 and 316 of the shoulder belt retractors rotate in unison and by equal amounts.

The four-point seat belt system 30 of FIG. 1 having the linked lap belt retractors 46 and 104 and, optionally, linked shoulder belt retractors 230 and 240 helps to position the buckle assembly 90 on the centerline of the occupant 18. The centerline of the occupant is indicated by line C in FIG. 1. By linking the lap belt retractors 46 and 104 together, equal amounts or lengths of lap belts 32 and 34 are withdrawn from the lap belt retractors regardless of the occupant's method of withdrawing the lap belts 32 and 34. For example, in the four-point seat belt system 30 of the present invention, an occupant 18 pulling on only lap belt 32 to withdraw the lap belt will cause an equal amount of lap belt 34 to be withdrawn. Likewise, when the buckle assembly 90 is latched and the lap belts 32 and 34 are released, the lap belt retractors 46 and 104 will retract equal amounts or lengths of the lap belts 32 and 34 to remove slack from the belts, and the buckle assembly 90 will be positioned along a centerline C of the occupant 18.

The four-point seat belt system 30 of the present invention may also include an indication system 394 (FIG. 1) for indicating to the occupant 18 that the system is not being worn correctly. The indication system 394 includes first and second belt tension sensors 396 and 398, respectively, a controller 400, and an indicator 402. When properly positioned on the occupant 18, the tension in lap belts 32 and 34 should be equal. The first belt tension sensor 396 is associated with lap belt 32 and senses the tension in lap belt 32. The second belt tension sensor 398 is associated with lap belt 34 and senses the tension in lap belt 34. The first and second belt tension sensors 396 and 398 provide signals indicative of the sensed tension to the controller 400. The controller 400 includes a comparator (not shown) for comparing the signals received from the first and second belt tension sensors 396 and 398. If the controller 400 determines that a difference greater than a predetermined amount exists between the sensed tension in the lap belt 32 and the sensed tension in the lap belt 34, the controller 400 provides a signal to the indicator 402. The indicator 402 then provides a visual or audible warning to the occupant 18 that the four-point seat belt system 30 is not being worn properly. The indicator 402 may, for example, be a light located on the vehicle instrument panel (not shown). Alternatively, first and second payout sensors (not shown) for sensing the payout of lap belts 32 and 34, respectively, may replace the first and second belt tension sensors 396 and 398 of the indication system 394.

Figure 5:
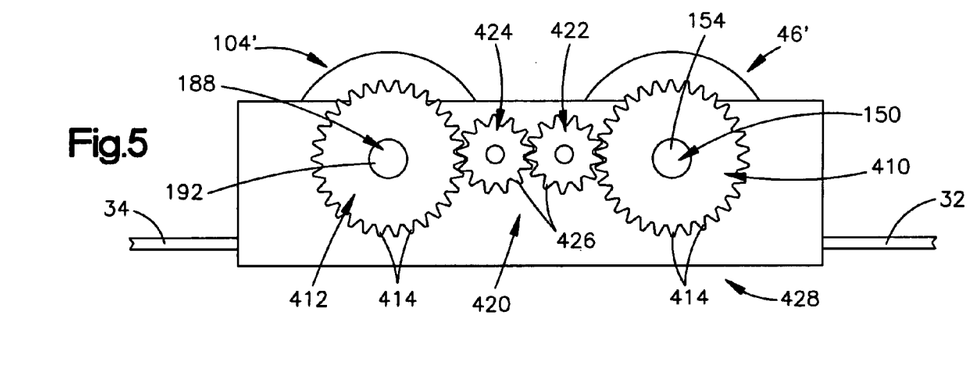
FIG. 5 illustrates an enlarged view of linked lap belt retractors for an occupant restraint system constructed in accordance with a second embodiment of the present invention.

FIG. 5 illustrates an enlarged side view of linked lap belt retractors 46' and 104' for an occupant restraint system constructed in accordance with a second embodiment of the present invention. The linked lap belt retractors 46' and 104' of FIG. 5 may be used with the four-point seat belt system 30 of FIG. 1.

Lap belt retractors 46' and 104' are similar in construction to the lap belt retractors 46 and 104 described with reference to FIG. 2 and 3 with the exception that the sprocket wheels 168 and 206 have been replaced with gear wheels 410 and 412, respectively. Thus, structures of FIG. 5 that are the same or similar to structures of FIGS. 2–3 are indicated using the same reference numbers.

The gear wheels 410 and 412 for lap belt retractors 46' and 104' are identical to one another. Each gear wheel 410 and 412 includes a plurality of teeth 414. The gear wheel 410 is fixedly attached to the second end 154 of the axle 150 of lap belt retractor 46' for rotation with the axle 150. The gear wheel 412 is fixedly attached to the second end 192 of the axle 188 of lap belt retractor 104' for rotation with the axle 188.

A gear drive assembly 420 links the lap belt retractors 46' and 104' together. The gear drive assembly 420 illustrated in FIG. 5 includes two identically sized drive assembly gear wheels 422 and 424. Each drive assembly gear wheel 422 and 424 includes a plurality of teeth 426. The drive assembly gear wheels 422 and 424 are in meshing engagement with one another. Additionally, drive assembly gear wheel 422 is in meshing engagement with the gear wheel 410 associated with lap belt retractor 46', and drive assembly gear wheel 424 is in meshing engagement with the gear wheel 412 associated with lap belt retractor 104'.

The gear wheels 410 and 412 associated with the lap belt retractors 46' and 104' and the drive assembly gear wheels 422 and 424 of the gear drive assembly 420, collectively, form a linking mechanism 428 for linking together the spools of the lap belt retractors 46' and 104'. When linked together, the spools of the lap belt retractors 46' and 104' rotate in unison during retraction and withdrawal of lap belts 32 and 34. Additionally, when the lap belt retractors 46' and 104' are linked by the linking mechanism 428, equal amounts or lengths of lap belts 32 and 34 are wound onto or retracted from the spools of the lap belt retractors 46' and 104' during rotation of the spools.

The two drive assembly gear wheels 422 and 424 of the gear drive assembly 420 enable the spools of the lap belt retractors 46' and 104' to rotate by equal amounts in opposite directions relative to one another. The linked lap belt retractors 46' and 104' of FIG. 5 help to position the buckle assembly of the four-point occupant restraint system on the centerline of the occupant regardless of the occupant's method of withdrawing the lap belts 32 and 34.

From the above description of the invention, those skilled in the art will perceive improvements, changes and modifications. Such improvements, changes and modifications within the skill of the art are intended to be covered by the appended claims.

Having described the invention, we claim the following:

1. A vehicle restraint system for helping to restrain a vehicle occupant in a vehicle seat, the vehicle restraint system comprising:
   first and second lap belts for collectively extending across a lap of the occupant;
   first and second shoulder belts for extending over the shoulders of the occupant;
   a buckle assembly for interconnecting the lap belts and the shoulder belts;
   first and second lap belt retractors for the first and second lap belts, respectively, the first and second lap belt retractors being spaced away from one another and enabling retraction and withdrawal of the first and second lap belts, respectively; and
   a linking mechanism connecting the first and second lap belt retractors and adapted to transfer motion between the first and second lap belt retractors so that the first and second lap belts are retracted in unison and by equal amounts during retraction and are withdrawn in unison and by equal amounts during withdrawal from the first and second lap belt retractors,
   spools of the first and second lap belt retractors aligning with one another on a first side of the linking mechanism to cause the first and second lap belts to extend outwardly of the first and second lap belt retractors in directions generally parallel to and collinear to one another and toward opposite sides of the seat.

2. The vehicle restraint system of claim 1 wherein the linking mechanism includes first and second gear wheels and a gear drive assembly, the first gear wheel being fixed for rotation with a first spool of the first lap belt retractor and the second gear wheel being fixed for rotation with a second spool of the second lap belt retractor, the gear drive assembly connecting the first and second gear wheels and transferring motion between the first and second gear wheels.

3. The vehicle restraint system of claim 2 wherein the first spool rotates in a direction opposite to a direction in which the second spool is rotating during retraction and withdrawal of the first and second lap belts, the gear drive assembly being located in an area between the first and second lap belt retractors and including an even number of drive assembly gear wheels for enabling rotation of the first and second spools in opposite directions.

4. The vehicle restraint system of claim 3 wherein the first spool is identical to the second spool, the first gear wheel is identical to the second gear wheel, and the drive assembly gear wheels are identical to one another.

5. The vehicle restraint system of claim 2 further including first and second shoulder belt retractors for the first and second shoulder belts, respectively, the first and second shoulder belt retractors enabling retraction and withdrawal of the first and second shoulder belts, the first and second shoulder belt retractors being linked together so that the first and second shoulder belts are retracted in unison and by equal amounts during retraction and are withdrawn in unison and by equal amounts during withdrawal from the first and second shoulder belt retractors.

6. The vehicle restraint system of claim 5 wherein a universal joint connects the first and second shoulder belt retractors, the universal joint connecting a first axle of a first spool of the first shoulder belt retractor and a second axle of a second spool of the second shoulder belt retractor.

7. The vehicle restraint system of claim 6 wherein the universal joint includes first and second segments that are pivotally connected to one another about a first pivot axis, the universal joint being adapted to compensate for misalignment about the first pivot axis between the first and second shoulder belt retractors.

8. The vehicle restraint system of claim 7 wherein the universal joint further includes a third segment that is pivotally connected to the second segment about a second pivot axis, perpendicular to the first pivot axis, the universal joint being adapted to compensate for misalignment about the second pivot axis between the first and second shoulder belt retractors.

9. A vehicle restraint system for helping to restrain a vehicle occupant in a vehicle seat, the vehicle restraint system comprising:
   first and second lap belts for collectively extending across a lap of the occupant;
   first and second shoulder belts for extending over the shoulders of the occupant;
   a buckle assembly for interconnecting the lap belts and the shoulder belts;
   first and second lap belt retractors for the first and second lap belts, respectively, the first and second lap belt retractors being spaced away from one another and enabling retraction and withdrawal of the first and second lap belts, respectively; and
   a linking, mechanism connecting the first and second lap belt retractors and adapted to transfer motion between the first and second lap belt retractors so that the first and second lap belts are retracted in unison and by equal amounts during retraction and are withdrawn in unison and by equal amounts during withdrawal from the first and second lap belt retractors, wherein the linking mechanism includes first and second sprocket wheels and a chain, the first sprocket wheel being fixed for rotation with a first spool of the first lap belt retractor and the second sprocket wheel being fixed for rotation with a second spool of the second lap belt retractor, the chain connecting the first and second sprocket wheels and transferring motion between the first and second sprocket wheels.

10. The vehicle restraint system of claim 9 wherein the first spool rotates in a direction opposite to the second spool during retraction and withdrawal of the first and second lap belts, the chain including portions that cross one another in an area between the first and second lap belt retractors for enabling rotation of the first and second spools in opposite directions.

11. The vehicle restraint system of claim 10 wherein the chain is formed from a flexible material and includes opposite side surfaces, each of which is adapted to engage the first and second sprocket wheels.

12. The vehicle restraint system of claim 9 wherein the first spool is identical to the second spool and the first sprocket wheel is identical to the second sprocket wheel.

13. The vehicle restraint system of claim 9 wherein a spacer wall also connects the first and second lap belt retractors, the spacer wall being adapted to move relative to the first and second lap belt retractors to tension the chain.

14. The vehicle restraint system of claim 9 further including first and second shoulder belt retractors for the first and second shoulder belts, respectively, the first and second shoulder belt retractors enabling retraction and withdrawal of the first and second shoulder belts, the first and second shoulder belt retractors being linked together so that the first and second shoulder belts are retracted in unison and by equal amounts during retraction and are withdrawn in unison and by equal amounts during withdrawal from the first and second shoulder belt retractors.

15. The vehicle restraint system of claim 14 wherein a universal joint connects the first and second shoulder belt retractors, the universal joint connecting a first axle of a first spool of the first shoulder belt retractor and a second axle of a second spool of the second shoulder belt retractor.

16. The vehicle restraint system of claim 15 wherein the universal joint includes first and second segments that are pivotally connected to one another about a first pivot axis, the universal joint being adapted to compensate for misalignment about the first pivot axis between the first and second shoulder belt retractors.

17. The vehicle restraint system of claim 16 wherein the universal joint further includes a third segment that is pivotally connected to the second segment about a second pivot axis, perpendicular to the first pivot axis, the universal joint being adapted to compensate for misalignment about the second pivot axis between the first and second shoulder belt retractors.

18. A vehicle restraint system for helping to restrain a vehicle occupant in a vehicle seat, the vehicle restraint system comprising:

first and second lap belts for collectively extending across a lap of the occupant;

first and second shoulder belts for extending over the shoulders of the occupant;

a buckle assembly for interconnecting the lap belts and the shoulder belts;

first and second lap belt retractors for the first and second lap belts, respectively, the first and second lap belt retractors being spaced away from one another and enabling retraction and withdrawal of the first and second lap belts, respectively;

a linking mechanism connecting the first and second lap belt retractors and adapted to transfer motion between the first and second lap belt retractors so that the first and second lap belts are retracted in unison and by equal amounts during retraction and are withdrawn in unison and by equal amounts during withdrawal from the first and second lap belt retractors; and an indication system, the indication system including tension sensors for sensing tension in the first and second lap belts, respectively, and an indicator for indicating to an occupant that the first and second lap belts and the first and second shoulder belts are not being worn correctly when the sensed tension in the first lap belt differs by a predetermined amount, from the sensed tension in the second lap belt.

19. A vehicle restraint system for helping to restrain a vehicle occupant in a vehicle seat, the vehicle restraint system comprising:

first and second lap belts for collectively extending across a lap of the occupant;

first and second shoulder belts for extending over the shoulders of the occupant;

a buckle assembly for interconnecting the lap belts and the shoulder belts;

first and second lap belt retractors for the first and second lap belts, respectively, the first and second lap belt retractors being spaced away from one another and enabling retraction and withdrawal of the first and second lap belts, respectively; and a gear drive assembly connecting the first and second lap belt retractors and adapted to transfer motion between the first and second lap belt retractors so that the first and second lap belts are retracted in unison and by equal amounts during retraction and are withdrawn in unison and by equal amounts during withdrawal from the first and second lap belt retractors, spools of the first and second lap belt retractors aligning with one another on a first side of the gear drive assembly to cause the first and second lap belts to extend outwardly of the first and second lap belt retractors in directions generally parallel to and collinear to one another and toward opposite sides of the seat.

20. The vehicle restraint system of claim 19 wherein a first gear wheel is fixed for rotation with a first spool of the first lap belt retractor and a second gear wheel is fixed for rotation with a second spool of the second lap belt retractor, the gear drive assembly connecting the first and second gear wheels and transferring motion between the first and second gear wheels.

21. The vehicle restraint system of claim 20 wherein the first spool rotates in a direction opposite to a direction in which the second spool is rotating during retraction and withdrawal of the first and second lap belts, the gear drive assembly being located in an area between the first and second lap belt retractors and including an even number of drive assembly gear wheels for enabling rotation of the first and second spools in opposite directions.

22. The vehicle restraint system of claim 21 wherein the first spool is identical to the second spool, the first gear wheel is identical to the second gear wheel, and the drive assembly gear wheels are identical to one another.

23. The vehicle restraint system of claim 19 further including first and second shoulder belt retractors for the first and second shoulder belts, respectively, the first and second shoulder belt retractors enabling retraction and withdrawal of the first and second shoulder belts, the first and second shoulder belt retractors being linked together so that the first and second shoulder belts are retracted in unison and by equal amounts during retraction and are withdrawn in unison and by equal amounts during withdrawal from the first and second shoulder belt retractors.

24. The vehicle restraint system of claim 23 wherein a universal joint connects the first and second shoulder belt retractors, the universal joint connecting a first axle of a first spool of the first shoulder belt retractor and a second axle of a second spool of the second shoulder belt retractor.

25. A vehicle restraint system for helping to restrain a vehicle occupant in a vehicle seat, the vehicle restraint system comprising:
   first and second lap belts for collectively extending across a lap of the occupant;
   first and second shoulder belts for extending over the shoulders of the occupant;
   a buckle assembly for interconnecting the lap belts and the shoulder belts;
   linked first and second lap belt retractors for the first and second lap belts, respectively, the linked first and second lap belt retractors retracting the first and second lap belts in unison and by equal amounts during retraction and enabling withdrawal of the first and second lap belts in unison and by equal amounts during withdrawal; and
   an indication system, the indication system including sensors for sensing characteristics of the first and second lap belts, respectively, and an indicator for indicating to an occupant that the first and second lap belts and the first and second shoulder belts are not being worn correctly when the sensed characteristics of the first and second lap belts differ by a predetermined amount.

26. The vehicle restraint system of claim 25 further including first and second shoulder belt retractors for the first and second shoulder belts, respectively, the first and second shoulder belt retractors enabling retraction and withdrawal of the first and second shoulder belts, the first and second shoulder belt retractors being linked together so that the first and second shoulder belts are retracted in unison and by equal amounts during retraction and are withdrawn in unison and by equal amounts during withdrawal from the first and second shoulder belt retractors.

27. The vehicle restraint system of claim 26 wherein a universal joint connects the first and second shoulder belt retractors, the universal joint connecting a first axle of a first spool of the first shoulder belt retractor and a second axle of a second spool of the second shoulder belt retractor.

28. The vehicle restraint system of claim 25 wherein the linked first and second lap belt retractors are connected by a linking mechanism, the linking mechanism includes first and second gear wheels and a gear drive assembly, the first gear wheel being fixed for rotation with a first spool of the first lap belt retractor and the second gear wheel being fixed for rotation with a second spool of the second lap belt retractor, the gear drive assembly connecting the first and second gear wheels and transferring motion between the first and second gear wheels.

29. The vehicle restraint system of claim 28 wherein the first spool rotates in a direction opposite to a direction in which the second spool is rotating during retraction and withdrawal of the first and second lap belts, the gear drive assembly being located in an area between the first and second lap belt retractors and including an even number of drive assembly gear wheels for enabling rotation of the first and second spools in opposite directions.

30. The vehicle restraint system of claim 25 wherein the linked first and second lap belt retractors are connected by a linking mechanism, the linking mechanism includes first and second sprocket wheels and a chain, the first sprocket wheel being fixed for rotation with a first spool of the first lap belt retractor and the second sprocket wheel being fixed for rotation with a second spool of the second lap belt retractor, the chain connecting the first and second sprocket wheels and transferring motion between the first and second sprocket wheels.

31. The vehicle restraint system of claim 30 wherein the first spool rotates in a direction opposite to a direction in which the second spool is rotating during retraction and withdrawal of the first and second lap belts, the chain including portions that cross one another in an area between the first and second lap belt retractors for enabling rotation of the first and second spools in opposite directions.

32. The vehicle restraint system of claim 25 wherein the sensors for sensing characteristics of the first and second lap belts include first and second tension sensors, the first tension sensor sensing tension in the first lap belt and the second tension sensor sensing tension in the second lap belt, the indicator indicating to the occupant that the first and second lap belts and the first and second shoulder belts are not being worn correctly when the sensed tensions of the first and second lap belts differ by the predetermined amount.

\* \* \* \* \*